Feb. 23, 1937.  G. NAPOLITAN  2,071,420
BRAKE
Filed March 22, 1935   2 Sheets-Sheet 1
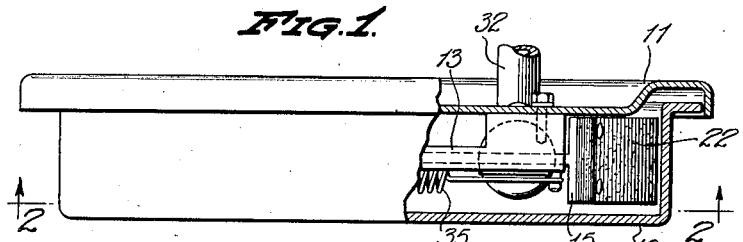
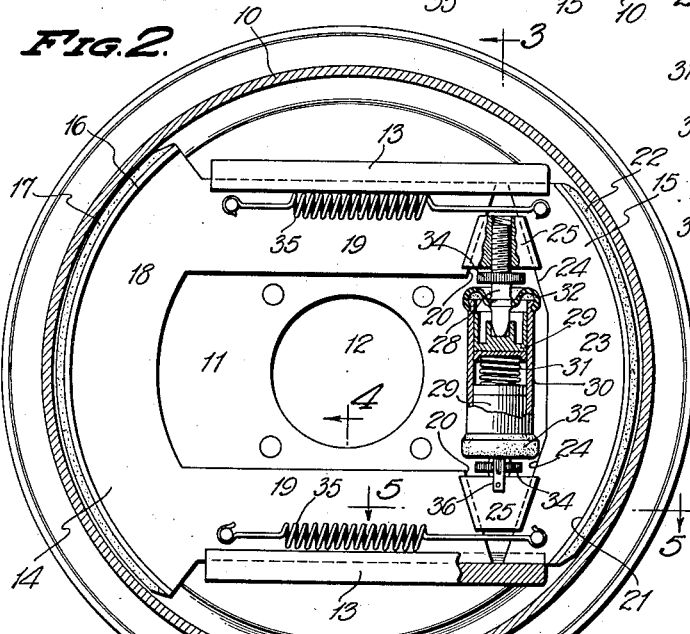
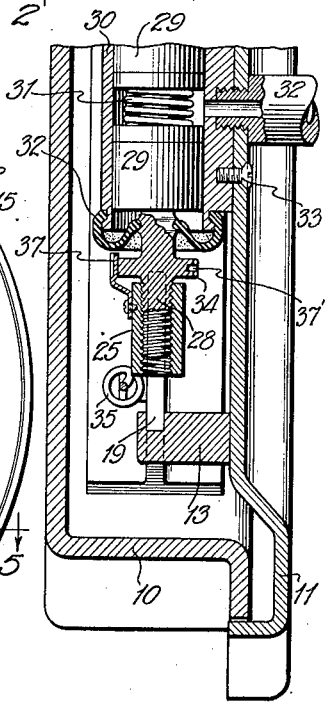
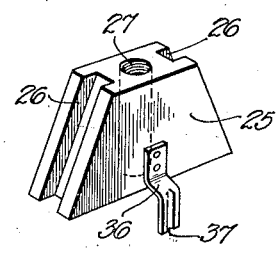
INVENTOR.
GENE NAPOLITAN.
BY Ely & Pattison
ATTORNEYS Feb. 23, 1937.  G. NAPOLITAN  2,071,420
BRAKE
Filed March 22, 1935   2 Sheets-Sheet 2

INVENTOR.
GENE NAPOLITAN.
BY Ely & Pattison
ATTORNEYS.

WITNESS:

Patented Feb. 23, 1937

2,071,420

UNITED STATES PATENT OFFICE 2,071,420

BRAKE

Gene Napolitan, Brooklyn, N. Y.

Application March 22, 1935, Serial No. 12,371

6 Claims. (Cl. 188—78)

This invention relates to improvements in brakes, and more particularly to internal brakes for automobiles.

One of the main features of the invention resides in a brake mechanism by which a more efficient braking action may be obtained between the brake shoes and the brake drum by reason of the equal distribution of force to the ends of the brake shoes during expanding movement thereof, and which tends to cause even wear throughout the braking surface of the brake shoes.

Another feature of the invention is the provision of a brake mechanism having a simple and efficient means for effecting an adjustment of the brake shoe expanding mechanism to take up wear when it occurs between the brake shoes and the brake drum.

A further object of the invention is to provide a brake mechanism having the above features in which the parts are associated in a novel manner to facilitate the removal of the brake shoes when worn to enable the relining thereof.

With these and other objects in view, the invention resides in the certain novel construction, combination and arrangement of parts, the essential features of which are hereinafter fully described in the following specification, are particularly pointed out in the appended claims, and are illustrated in the accompanying drawings, in which:

Figure 1 is a top plan view partly in section of my improved brake mechanism for operation by hydraulics.

Figure 2 is a vertical sectional view on the line 2—2 of Figure 1.

Figure 3 is an enlarged detail vertical sectional view on the line 3—3 of Figure 2.

Figure 4 is a detail vertical sectional view on the line 4—4 of Figure 2.

Figure 5 is a detail horizontal sectional view on the line 5—5 of Figure 2.

Figure 6 is a perspective view of one of the wedge members.

Figure 7:
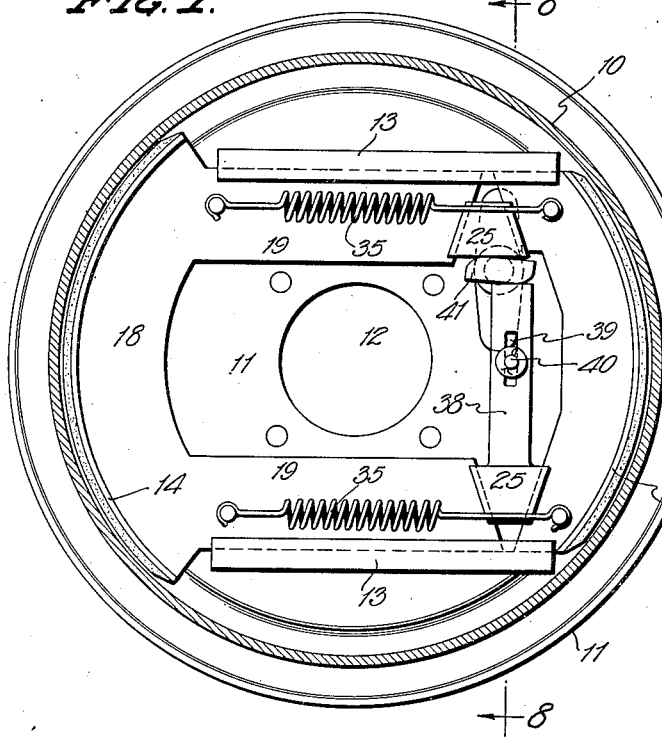
Figure 7 is a vertical sectional view through a modified form of brake with the operating parts thereof in side elevation.

Referring to the drawings by reference characters wherein like characters refer to similar parts throughout the several forms of my invention, the numeral 10 designates a conventional brake drum adapted to be fixedly attached to the inner side of a vehicle wheel while closing the inner open side of the brake drum, is a fixed anchor plate 11 on which the operating parts of the brake mechanism are mounted. The anchor plate 11 is provided with a central opening 12 for the passage of an axle while fixedly secured to the inside of the plate above and below the horizontal axis thereof are horizontally disposed tracks or guides 13—13.

Slidably supported by the horizontal guides 13—13 are brake shoes 14 and 15. The brake shoes 14 and 15 are diametrically opposed and are of different shapes, the brake shoe 14 including an arcuate shaped flange 16 on which the brake lining 17 is attached, while extending inwardly from the flange 16 is a substantially U-shaped web 18, the legs 9—19 being slidably received in the respective tracks or guides 13—13. The legs 19—19 extend horizontally to a position beyond the plane of the opening 12 and adjacent the brake shoe 15. The free end of the legs 19—19 are beveled in reverse direction, the bevel of the upper leg 19 being downwardly and inwardly inclined while the bevel on the lower leg 19 is downwardly and outwardly inclined.

The brake shoe 15 comprises an arcuate shaped flange 21, the outer face of which has brake lining material 22 fixedly secured thereon, whereas a web 23 extends inwardly from the flange 21 and is provided with reversely inclined surfaces 24—24 which are disposed opposite the surfaces 20—20 of the legs 19. The inclination of the surfaces 24—24 are opposite to that of the adjacent inclined surfaces 20—20 to provide a substantially inverted V-shaped space between the upper ends of the webs of the brake shoes and to provide a substantially V-shaped space between the lower end of the brake shoes. The extreme ends of the web 23 are also slidably received in the tracks 13 whereby the brake shoes may slide toward and away from each other for expanding movement into engagement with the brake drum or to a retracted position free of the drum.

In Figures 1 to 6 inclusive, I employ hydraulic means for expanding the brake shoes into braking engagement with the drum, and which means includes a pair of keystone shaped wedges 25—25, each of which has its inclined sides provided with channels 26 for receiving the inclined portions of the webs 18 and 23, whereas a threaded bore 27 extends vertically or lengthwise through the wedges for threadedly receiving the threaded ends of stems 28. The inner end of each stem 28 bears against a piston 29 arranged within a cylinder 30, the piston 29 being normally in a retracted position and urged thereto by a spring 31 interposed between the pistons 29 and respectively connected thereto. The ends of the cylinder 29 are closed by rubber caps 32 through which the stems 28 pass and which stems are air tightly connected to the caps as illustrated in Figures 2 and 3 of the drawings. Entering the cylinder 30 through the anchor plate 11 is a fluid supply line 32, the pressure from which is adapted to expand the pistons 29 in opposite directions for the purpose of imparting an expanding action to the brake shoes through the wedges 25. It will be understood that the cylinder 30 is fixedly secured to the anchor plate 11 as shown in Figure 3 of the drawings wherein screws 33 are employed as fastening elements.

For the purpose of facilitating adjustment of the wedges 25, each stem 28 is provided with a knurled manipulating flange 34 whereby turning of the flange will effect a sliding movement of the wedge to adjust the normal position of the same. By the manipulation of the flange 34 to impart turning movement to a stem 28, any wear between the brake shoes and the drum may be taken up.

For the purpose of normally holding the brake shoes 14 and 15 in a retracted position, springs 35 have one of their ends connected to the respective legs 19—19 and their other ends fastened adjacent the ends of the web 23.

For the purpose of holding the stems 28 in an adjusted position spring catches 36 are fixed to the wedges 25 and are formed with inwardly extending detents or teeth 37 for engagement with the milled surface or teeth provided on the flanges 34. If desired, the periphery of the flange 34 may be provided with recesses or sockets 37' radially arranged to accommodate the insertion of an instrument to effect turning movement of the stems 28.

From the foregoing description, it will be seen that the brake shoes 14 and 15 are normally in a retracted position as shown in Figure 2, but upon the admission of fluid pressure into the cylinder 30, the pistons 29 will be forced outwardly in opposite directions and will in turn move the wedges 25 in opposite directions and which wedging movement expands the brake shoes 14 and 15 into braking contact with the drum 10. Release of the fluid pressure will enable the springs 35 to move the brake shoes to retracted position as well as the return of the other parts to normal position.

Figure 8:
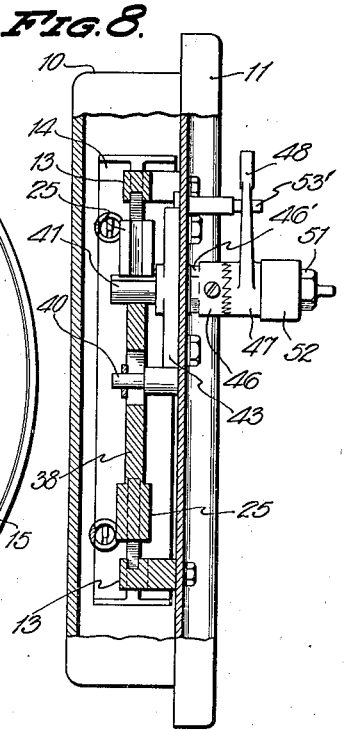
Figure 8 is a vertical transverse sectional view on the line 8—8 of Figure 7.
Figure 10:
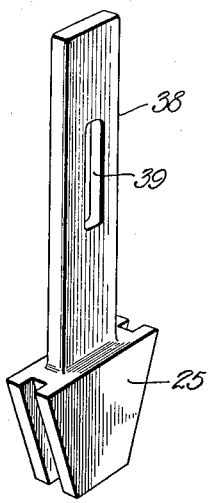
Figure 10 is a detail perspective view of one of the brake shoe expanding wedges.
Figure 9:
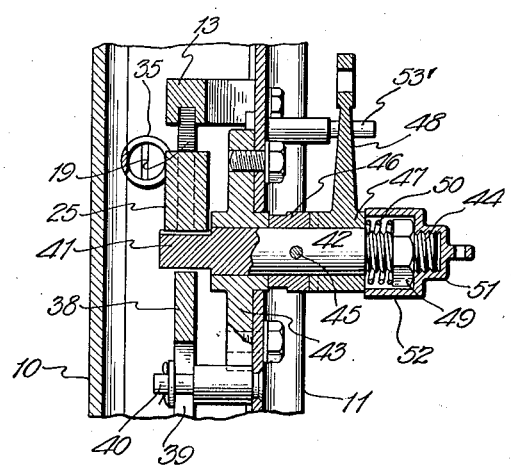
Figure 9 is an enlarged detail vertical sectional view of the brake adjusting mechanism.

In the form of my invention shown in Figures 7 to 10 inclusive, substantially the same construction is present as that hereinbefore described, with the exception that the shoes are moved to their braking position by mechanical means rather than by hydraulic pressure, and the mechanical means for actuating the shoes will now be described. In this form, the lower of the wedges 25 is provided with an upwardly extending plate or shank 38 provided with an elongated slot 39 through which a guide pin 40 extends from the anchor plate 11. The top end of the plate 38 terminates adjacent the under side of the upper wedge 25 and interposed therebetween is a wedge expanding cam 41, the same being fixed to the inner end of a shaft 42 turnably mounted in a bearing 43 carried by the anchor plate 11. The shaft 42 extends outwardly beyond the anchor plate and terminates in a reduced threaded stud 44. Fixed to the shaft 42 by a pin 45 is a clutch collar 46 having nut faces 46' and ratchet teeth, while fitting upon the shaft and normally engaging the clutch collar 46 is a coacting clutch collar 47 having ratchet teeth for releasable engagement with the ratchet teeth of the collar 46, and from which an actuating arm or lever 48 extends, the said arm adapted to be operatively connected with the foot brake actuating mechanism of an automobile. Threaded upon the threaded stud 44 is a nut 49 and interposed between the inner side of the nut and the outer side of the clutch collar 47 is a spring 50, which tends to normally hold the ratchet teeth of the clutch collar 46 and clutch element 47 in clutching engagement. Also threaded to the stud 44 is a stop nut 51 having a hood or socket portion 52 enclosing the nut 49 and spring 50 and bearing against the clutch element 47. A stop pin 53' extends outwardly from the plate 11 into the path of movement of the lever 48 for limiting the movement of the lever in a non-braking direction.

In the operation of the form of my invention shown in Figures 7 to 10, it will be seen that upon actuation of the lever 48, turning movement will be imparted to the shaft 42 through the clutching elements 46 and 47, whereby the cam 41 will be turned to spread the wedges 25 in opposite directions, and which wedging action produces the same result as that hereinbefore described wherein hydraulic means was employed for the operation of the expanding wedges.

When it is desired to adjust the wedges 25 to compensate for wear between the brake shoes and the drum, the nut 51 may be unscrewed from the threaded stud 44 whereupon the clutch element 47 may be disengaged from the clutch collar 46 by applying a wrench to the nut portion 46' thereof and imparting a turning movement thereto to cause the engaging ratchet teeth between the element 47 and collar 46 to ride over each other, causing a turning movement to be imparted to the shaft 42 to change the normal radial position of the actuating cam 41 without disturbing the normal position of the arm or lever 48. The spring 50 serves to keep the clutch element 47 in clutching engagement with the clutch collar 46 while effecting an adjustment of the cam 41.

From the foregoing description, it will be noted that in both forms, there is provided a pair of diametrically opposed slidably mounted brake shoes which are clear of the plane of the opening 12 in the anchor plate to facilitate the passage of an axle without interference to the brake mechanism. Also, the brake mechanism is mounted as a unit upon the anchor plate, and that the parts are readily accessible upon the removal of the wheel of a vehicle on which the brake drum is mounted.

While I have illustrated two forms of my invention, it will be understood that other changes and modifications may be resorted to as come within the scope of the appended claims if so desired.

Having thus described the invention, what I claim as new and desire to secure by Letters Patent of the United States, is:—

1. In a brake, a drum, a pair of opposed slidably mounted shoes, one of said shoes having a substantially U-shaped web, the ends of the legs of the U-shaped web being inwardly inclined and terminating in spaced relation with the web of the other shoe, inclined surfaces provided on the web of the other shoe opposite the inclined ends of the U-shaped web and inclined in a direction opposite thereto to provide V-shaped spaces therebetween, slide wedges disposed within the V-shaped spaces for wedging engagement with the inclined portions of the webs of said shoes, spring means acting upon said shoes to hold the same in a normally retracted position, and operable means for simultaneously moving said wedges in opposed direction to cause the shoes to be moved to an expanded position into braking engagement with said drums against the action of said spring means.

2. In a brake, a rotatable drum, a fixed brake anchor plate closing one side of said drum, a pair of opposed brake shoes slidably mounted upon said anchor plate, the webs of said brake shoes terminating in spaced relation with respect to each other, a rotatable actuating cam member journaled in said plate, means for facilitating radial adjustment of said cam member relative to its axis, and wedge means between said actuating cam member and the webs of said shoes and operable upon turning movement of said actuating cam member to expand said shoes into braking engagement with said drum.

3. In a brake, a drum, a pair of opposed slidably mounted shoes, one of said shoes having a substantially U-shaped web, the ends of the legs of the U-shaped web being inwardly inclined and terminating in spaced relation with the web of the other shoe, inclined surfaces provided on the web of the other shoe opposite the inclined ends of the U-shaped web and inclined in a direction opposite thereto to provide V-shaped spaces therebetween, slide wedges disposed within the V-shaped spaces for wedging engagement with the inclined portions of the webs of said shoes, spring means acting upon said shoes to hold the same in a normally retracted position, and operable means for simultaneously moving said wedges in opposite directions to cause the shoes to be moved to an expanded position into braking engagement with said drum against the action of said spring means, and means for effecting an adjustment of said slide wedges relative to said operating means to compensate for wear between said shoes and said drum.

4. In a brake, a rotatable drum, a fixed brake anchor plate closing one side of said drum and having a central opening for the passage of an axle, a pair of diametrically opposed brake shoes slidably supported upon said anchor plate for movement toward and away from each other, the web of one of said brake shoes being U-shaped and terminating in spaced relation with respect to the web of the other brake shoe, the U-shaped web adapted to straddle an axle passed through said opening, reversely inclined surfaces provided on adjacent opposed ends of the webs of said brake shoes, shoe expanding means intermediate the spaced webs and operatively engaged with the reversely inclined surfaces for sliding said shoes to an expanded position into engagement with said drum, and spring means acting to move said shoes to a retracted position.

5. In a brake, a drum, a pair of opposed slidably mounted shoes, one of said shoes having a substantially U-shaped web, the ends of the legs of the U-shaped web being inwardly inclined and terminating in spaced relation with the web of the other shoe, inclined surfaces provided on the web of the other shoe opposite the inclined ends of the U-shaped web and inclined in a direction opposite thereto to provide V-shaped spaces therebetween, slide wedges disposed within the V-shaped spaces for wedging engagement with the inclined portions of the web of said shoes, spring means acting upon said shoes to hold the same in a normally retracted position, and hydraulic operating means for simultaneously moving said wedges in opposed direction to cause the shoes to be moved to an expanded position into braking engagement with said drum against the action of said spring means.

6. In a brake, a drum, a pair of opposed slidably mounted shoes, one of said shoes having a substantially U-shaped web, the ends of the legs of the U-shaped web being inwardly inclined and terminating in spaced relation with the web of the other shoe, inclined surfaces provided on the web of the other shoe opposite the inclined ends of the U-shaped web and inclined in a direction opposite thereto to provide V-shaped spaces therebetween, slide wedges disposed within the V-shaped spaces for wedging engagement with the inclined portions of the webs of said shoes, spring means acting upon said shoes to hold the same in a normally retracted position, and cam actuated means for simultaneously moving said wedges in opposed directions to cause the shoes to be moved to an expanded position into braking engagement with said drum against the action of said spring means.

GENE NAPOLITAN.